United States Patent [19]

Smith

[11] Patent Number: 5,992,796

[45] Date of Patent: Nov. 30, 1999

[54] SECONDARY WING SYSTEM FOR USE ON AN AIRCRAFT

[75] Inventor: Brian E. Smith, Moutain View, Calif.

[73] Assignee: The United States of America as represented by the Administrator of the National Aeronautics and Space Administration, Washington, D.C.

[21] Appl. No.: 08/828,826

[22] Filed: Mar. 13, 1997

[51] Int. Cl.[6] .................................................... B64C 3/56
[52] U.S. Cl. ........................................ 244/45 A; 244/46
[58] Field of Search .............................. 244/13, 15, 45 R, 244/45 A, 46, 49, 87, 89

[56] References Cited

U.S. PATENT DOCUMENTS

| | | | |
|---|---|---|---|
| 2,601,962 | 7/1952 | Douglas | 244/89 |
| 3,155,344 | 11/1964 | Vogt | 244/46 |
| 4,008,867 | 2/1977 | Kaniut | 244/87 |
| 4,161,300 | 7/1979 | Schwaerzler et al. | |
| 4,542,866 | 9/1985 | Caldwell et al. | |
| 4,598,888 | 7/1986 | Beteille | 244/45 A |
| 4,641,800 | 2/1987 | Rutan | |
| 4,842,218 | 6/1989 | Groutage et al. | 244/49 |
| 4,848,700 | 7/1989 | Lockheed | |
| 4,899,954 | 2/1990 | Pruszenski, Jr. | |
| 4,913,378 | 4/1990 | Calvert | 244/46 |
| 4,998,689 | 3/1991 | Woodcock | 244/46 |
| 5,071,088 | 12/1991 | Betts | |
| 5,118,052 | 6/1992 | Calderon | 244/49 |
| 5,192,037 | 3/1993 | Moorefield | |
| 5,398,888 | 3/1995 | Gerhardt | |
| 5,495,999 | 3/1996 | Cymara | 244/49 |
| 5,564,652 | 10/1996 | Trimbath | |
| 5,671,898 | 9/1997 | Brown | 244/49 |
| 5,681,010 | 10/1997 | Jensen | 244/49 |

FOREIGN PATENT DOCUMENTS 1334496  7/1963  France ..................................... 244/46

OTHER PUBLICATIONS

Andy Lennon, "Canard–A Revolution in Flight," 1984, pp.70–73, and 164–171.

"Janes All the World's Aircraft" 1979–1980, pp. 215, 396, 401.

*Primary Examiner*—Galen L. Barefoot
*Attorney, Agent, or Firm*—Kathleen Dal Bon; Harry Lupuloff; John G. Mannix

[57] ABSTRACT

A secondary wing system for use on an aircraft augments the lift, stability, and control of the aircraft at subsonic speeds. The secondary wing system includes a mechanism that allows the canard to be retracted within the contour of the aircraft fuselage from an operational position to a stowed position. The top surface of the canard is exposed to air flow in the stowed position, and is contoured to integrate aerodynamically and smoothly within the contour of the fuselage when the canard is retracted for high speed flight. The bottom portion of the canard is substantially flat for rotation into a storage recess within the fuselage. The single canard rotates about a vertical axis at its spanwise midpoint. The canard can be positioned between a range of sweep angles during flight and a stowed position in which its span is substantially parallel to the aircraft fuselage. The canard can be deployed and retracted during flight. The deployment mechanism includes a circular mounting ring and drive mechanism that connects the canard with the fuselage and permits it to rotate and to change incidence. The deployment mechanism further includes retractable fairings which serve to streamline the wing when it is retracted into the top of the fuselage.

30 Claims, 14 Drawing Sheets

SECONDARY WING SYSTEM FOR USE ON AN AIRCRAFT

ORIGIN OF THE INVENTION

The invention described herein was made by an employee of the United States Government and may be manufactured and used by or for the Government for governmental purposes without payment of any royalties thereon or therefor.

BACKGROUND OF THE INVENTION

1. Technical Field of the Invention

The present invention relates in general to wing systems for use on a vehicle in aerodynamic or hydrodynamic applications, and it more particularly relates to a low-speed, conformally stowable secondary wing system for use in high speed civil transport aircraft to optimize vehicle performance and efficiency.

2. Description of the Prior Art

Canards, including small forward-mounted secondary wings, increase the total wing surface area of an aircraft for improving the low speed lift-to-drag ratio and trim characteristics of the aircraft. While canard concepts have been used in supersonic aircraft to increase low-speed performance, these designs do not allow for optimal high-speed performance and aerodynamic efficiency.

Existing canard concepts for application to high-speed aircraft fall into two general categories: fixed non-retractable configurations, and symmetrically retractable configurations which stow into cavities within the forward fuselage. An exemplary fixed canard is used in the supersonic XB-70 Valkyrie aircraft and remains deployed throughout all phases of flight. Such fixed canards allow for increased lift capabilities and greater stability at lower speeds, thus decreasing the amount of engine thrust and noise during takeoff and landing. Because fixed canards remain exposed to the airstream at supersonic cruise speeds, their induced, profile, and skin friction drags represent significant portions of the overall drag on the aircraft. Because the economic success of a high speed civil transport aircraft is highly dependent upon reducing the cruise drag to the lowest possible level, fixed canards are not desirable in this or similar vehicles.

A hybrid concept of the fixed canard design was employed by the Beechcraft Starship 1 aircraft, which utilized relatively long and narrow, dual-position symmetric canards. At low speeds the canard is fully deployed, while at high speeds the canard is partially swept back. The canard is used in the forward position during take-off and landing to offset the negative pitching moments induced by extension of the trailing edge flaps on the main wing, while it is partially swept back to decrease drag and optimize trim characteristics at cruise speeds. While this variable geometry canard design offers a compromise between low speed performance and high speed efficiency, it is not an optimal design for high speed civil transport aircraft as the canard remains exposed to the airstream during all phases of flight.

In an attempt to optimize low speed performance and high speed efficiency, the Tupolev Tu-144 supersonic transport vehicle employed two symmetrically retractable canards which stow independently into cavities within the forward fuselage. While the retractable canard concept improves upon the problems of fixed-wing and variable geometry canards, several shortcomings remain. First, the two separate hinge and actuation systems or mechanisms required to fold and support the right and left canards add to the overall weight of the aircraft. Second, the structural complexity of the hinge and deployment/retraction actuation systems increases the probability of failure during flight. Third, although the canards are stowed quasi-conformally within cavities in the upper fuselage behind the cockpit, the overall surface smoothness of the fuselage is compromised by the presence of the canards. Fourth, the rectangular platform (e.g., wing shape) used for the Tu-144 canards is not ideal for optimum aerodynamic efficiency. While leading and trailing edge high-lift devices (e.g., slats and flaps) may be used to optimize lift characteristics, such devices further add to the structural complexity and overall weight of the canard and may increase the probability of mechanical failure.

Another aircraft designed to provide low-speed high-lift capability while maintaining high-speed efficiency is the NASA AD-1 oblique wing aircraft. This small aircraft utilizes a single, quasi-elliptical, pivotable wing which rotates about a central axis. At low flight speeds, the wing is positioned perpendicularly to the fuselage, thus providing good lift characteristics without complex high-lift systems. During high-speed flight, the wing is pivoted to form an oblique angle of up to 60 degrees with the main axis of the fuselage, thus reducing drag and increasing speed. However, because the oblique wing is the primary lifting surface of the aircraft, it is not conformally stowed during the high speed flight phase.

A movable wing is used in the pivotable mono wing cruise missile described in U.S. Pat. No. 4,842,218 to Groutage et al. The missile has a single, pivotable wing which is positionable to either a captive carry position or an extended free-flight position. While the pivotable wing described in the Groutage et al. patent may be suitable as a primary wing for a cruise missile, it is not suitable for use as a low-speed secondary wing system on a supersonic aircraft. The spring-loaded, one-way deployment mechanism described in the Groutage et al. patent is not capable of retracting the wing during flight, nor is the wing conformally stowable.

Various canard concepts that relate to the general field of the present invention are illustrated in the following patents:

U.S. Pat. No. 4,161,300 to Schwaerzler, et al.;
U.S. Pat. No. 4,542,866 to Caldwell, et al.;
U.S. Pat. No. 4,641,800 to Rutan;
U.S. Pat. No. 4,484,700 to Lockheed;
U.S. Pat. No. 4,899,954 to Pruszenski, Jr.;
U.S. Pat. No. 5,071,088 to Betts;
U.S. Pat. No. 5,192,037 to Moorefield;
U.S. Pat. No. 5,398,888 to Gerhardt;
U.S. Pat. No. 5,495,999 to Cymara;
U.S. Pat. No. 5,564,652 to Trimbath;

SUMMARY OF THE INVENTION

The present invention provides a secondary wing system having a single pivoting canard that can be deployed to augment the lift, stability, and control of an aircraft during various flight regimes, and that can be conformally retracted into the fuselage in order to minimize drag at high speeds.

The secondary wing system of the present invention includes a single-canard with an aerodynamically efficient planform shape for reducing engine power required for low-speed operation, thus resulting in lower noise levels during take-off, climb-out, approach, and landing.

The secondary wing system of the present invention provides a retractable canard with leading and trailing-edge control surfaces to enhance the aerodynamic performance of the airplane.

The system of the present invention further provides a high-strength ring and track mounting and rotation mechanism that connects the canard to the aircraft fuselage, and that permits the canard to rotate and to change incidence, while minimizing intrusion of the mechanical rotation hardware into the volume of the fuselage.

The secondary wing system of the present invention also provides a novel assembly of retractable fairings which streamline the leading and trailing edges of the canard when it is stowed, thus optimizing aerodynamic efficiency for high-speed flight.

Briefly, the foregoing and further features and objects of the present invention are realized by a secondary wing system that augments the lift, stability, and control of the aircraft at subsonic speeds. The secondary wing system includes a mechanism that allows the canard to be retracted within the contour of the aircraft fuselage from an operational position to a stowed position.

The top surface of the canard is exposed to air flow in the stowed position, and is contoured to integrate aerodynamically and smoothly within the contour of the fuselage when the canard is retracted for high speed flight. The bottom portion of the canard is substantially flat for rotation into a storage recess within the fuselage. The single canard rotates about a vertical axis at its spanwise midpoint. The canard can be positioned between a range of sweep angles during flight and a stowed position in which its span is substantially parallel to the aircraft fuselage.

The canard can be deployed and retracted during flight. The deployment mechanism includes a circular mounting ring and drive mechanism that connects the canard with the fuselage and permits it to rotate and to change incidence. The deployment mechanism further includes retractable fairings which serve to streamline the wing when it is retracted into the top of the fuselage.

The canard of the present invention may additionally include a mechanism for securing the tips of the secondary wing to the fuselage when stowed, to prevent flutter and damage to the wing due to aerodynamic loads at high-speed, supersonic flight conditions.

An alternative embodiment of the secondary wing system of the present invention includes a constant-chord retractable canard configuration with arc-shaped wing tips that can be used on fuselage shapes with a constant area distribution from front to back. Additional alternative embodiments of the present invention include application of the secondary wing system concept as a retractable horizontal tail for use at the rear of an aircraft, and application of the secondary wing system to other classes of vehicles (e.g. hydrodynamic vehicles) to enhance maneuverability and performance.

BRIEF DESCRIPTION OF THE DRAWING

The above and other features of the present invention and the manner of attaining them will become apparent, and the invention itself will be best understood, by reference to the following description and the accompanying drawing, wherein.

Similar numerals refer to similar elements in the drawing. It should be understood that the sizes of the different components in the drawing are not in exact proportion, and are shown for visual clarity and for the purpose of explanation.

DETAILED DESCRIPTION OF THE PREFERRED EMBODIMENTS

Figure 1:
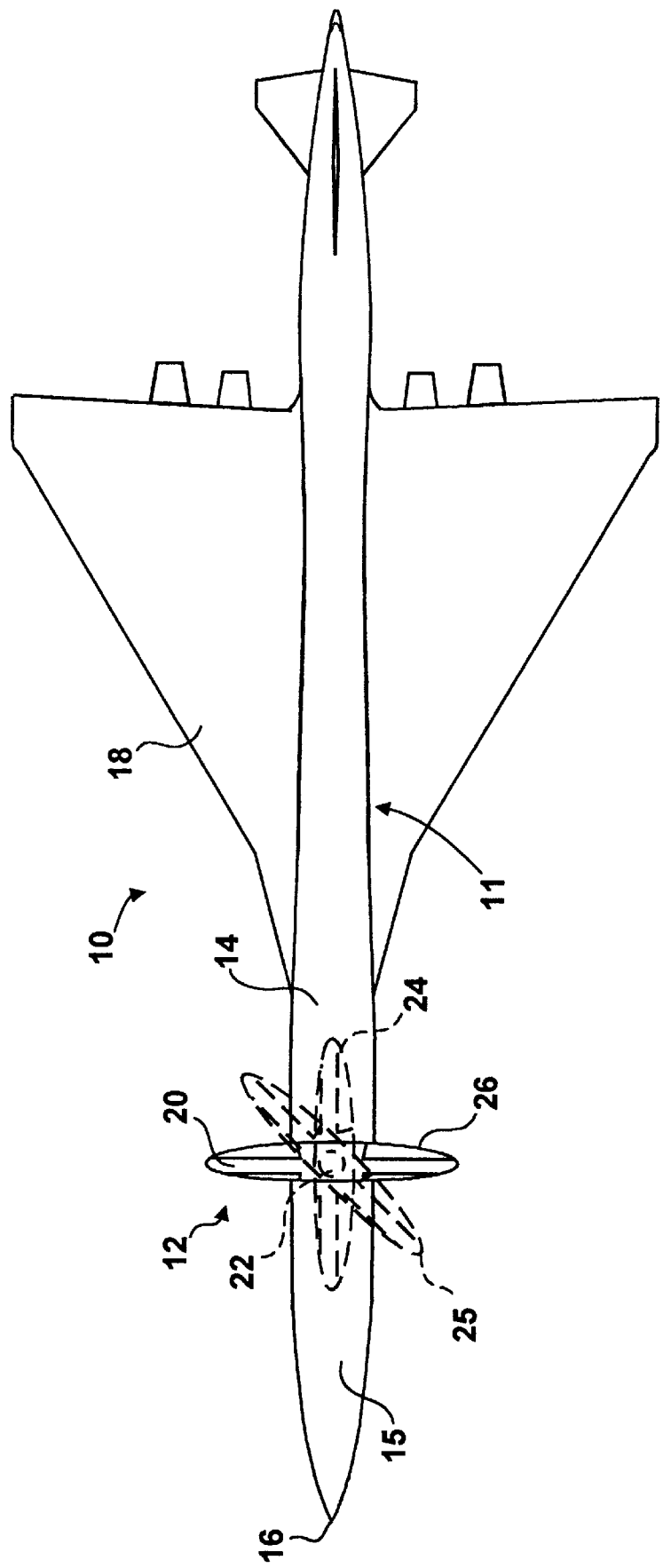
FIG. 1 is a top plan view of an aircraft equipped with a secondary wing system according to the present invention, and showing a single-piece canard in stowed, intermediate, and deployed positions.

FIG. 1 illustrates an aircraft 10 having a fuselage 11 equipped with a secondary wing system 12 according to the present invention. The secondary wing system 12 is incorporated in the upper portion 14 of a forward fuselage 15 that forms part of the fuselage 11. The secondary wing system 12 is positioned at an intermediate location between a nose 16 and a main or primary wing 18 of the aircraft 10.

The secondary wing system 12 includes a one-piece secondary wing or canard 20 which is secured via a structural attachment and rotation ring assembly 22 to the forward fuselage 15. The canard 20 is deployed and retracted within a selected range of angles by rotating about a vertical axis of rotation R—R at the midpoint of its span, as illustrated in FIGS. 4 through 8. When deployed, the canard 20 provides supplementary lift, stability and flight control. When the canard 20 is not in use, it is stowed fully and conformally within the aerodynamic contour of the upper portion 14 of the forward fuselage 15, so that it does not increase the drag on the aircraft 10.

The operation of the secondary wing system 12 will be described with further reference to FIG. 2. Prior to takeoff, the aircraft pilot activates the secondary wing system 12 by deploying the canard 20 from an initial stowed position (shown in dashed lines and referenced by the numeral 24) within the contour of the forward fuselage 15 to a fully deployed position (shown in solid lines and referenced by the numeral 26), such that the longitudinal axis X—X of the canard 20 is substantially normal to the longitudinal axis Y—Y of the forward fuselage 14. When the canard 20 is deployed it supplements the main wing 18 by providing additional wing surface area for generation of lift at low speeds.

During take-off, the canard 20 remains substantially perpendicular to the forward fuselage 15. As the aircraft 10 accelerates, the canard 20 may be progressively rotated to intermediate positions (shown in dashed lines and referenced by the numeral 25) between the fully deployed position 26 and the stowed position 24, and thereafter to its fully deployed position 26 in order to optimize the control and lift characteristics of the aircraft 10. In these intermediate positions 25 the effective span of the canard 20 is reduced. Alternatively, the canard 20 is rotated to its fully deployed position 26.

In certain phases of the flight, it may be desirable to leave the canard 20 partly or fully deployed to optimize the performance of the aircraft 10. At a predetermined aircraft speed the canard 20 may no longer be necessary to supplement lift and control of the aircraft 10, and is rotated to the conformally stowed position 24 within the contour of the forward fuselage 15 to minimize drag. As soon as the canard 20 is fully stowed, two automatic latch mechanisms 35, 36 (FIG. 5) are activated to secure the ends or tips of the canard 20 against airloads which may arise during high-speed flight, and further to secure the tips of the canard 20 during stowage to prevent against flutter during high-speed cruise. The two latch mechanisms 35, 36 are located in the upper portion 14, and are comprised of automatic fail safe latching pins which engage receptacles on the lower surface of the canard.

On deceleration from cruise flight conditions and landing, the canard 20 is deployed from its stowed position 24 to enhance aircraft performance, stability and control at lower speeds. Low speeds include subsonic speeds such as 250 knots. The angles of deployment of the canard 20 may be automatically adjusted by a flight control system (not shown) for optimized stability and control. Upon approach to landing, the canard 20 may be rotated to its fully deployed position 26 to provide maximum lift.

Figure 7:
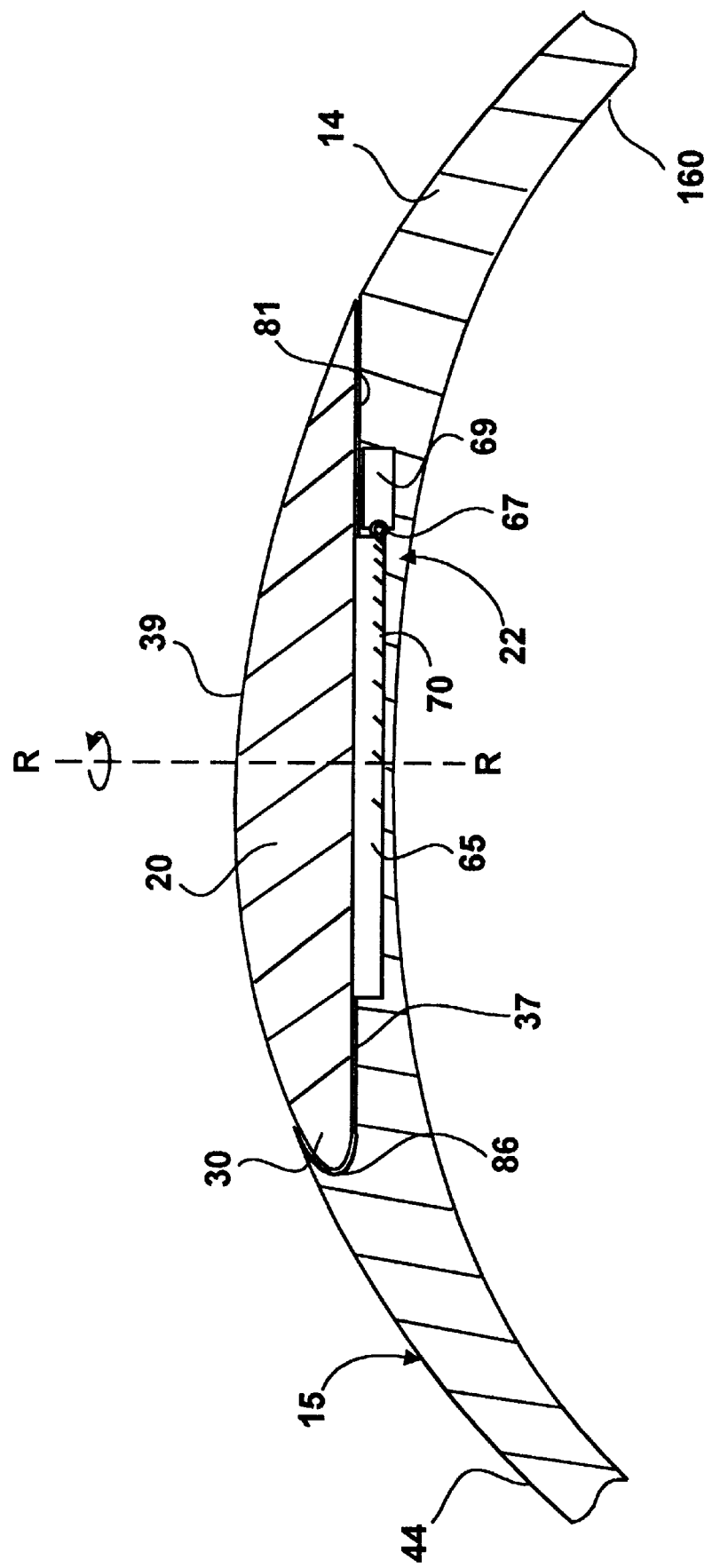
FIG. 7 is a cross sectional view of an upper fuselage of the aircraft of FIG. 5, taken along line 7—7, showing the canard in the stowed position.

The canard 20 is an airfoil defined by a leading edge 30 and a trailing edge 32. The leading edge 30 optionally includes one or more control surfaces 52, 54, and the trailing edge 32 optionally includes one or more control surfaces 58, 60. The canard 20 has a quasi-elliptical shape for high aerodynamic efficiency. It should be clear to a person of ordinary skill in the field that the canard 20 may have other aerodynamic shapes. With further reference to FIG. 7, the canard 20 has a substantially flat underside 37 and an upper surface or contour 39 which is determined by, and which complements the external contour 44 of the upper portion 14 of the forward fuselage 15.

The quasi-elliptical planform shape of the canard 20 is derived from a waterline cut through the upper portion 14 of the front of the area-ruled fuselage shape which is characteristic of supersonic aircraft. The canard 20 and its control surfaces 52, 54, 58, 60 may be made of metallic or composite or any other suitable materials. As shown in FIG. 2, the canard 20 may include a high-strength, full-span structural spar (shown in dashed lines and referenced by the numeral 61) located near the axis of rotation R—R, for optimizing the strength of the secondary wing system 12 while minimizing its weight. The spar 61 is tapered to fit within the contour of the canard airfoil 20. The spar 61 may be made of a metallic, composite, or any other suitable material. The spar 61 is similar to a conventional spar, and carries the aerodynamic loads generated by the canard 20 into the structural attachment and rotation ring assembly 22.

Figure 2:
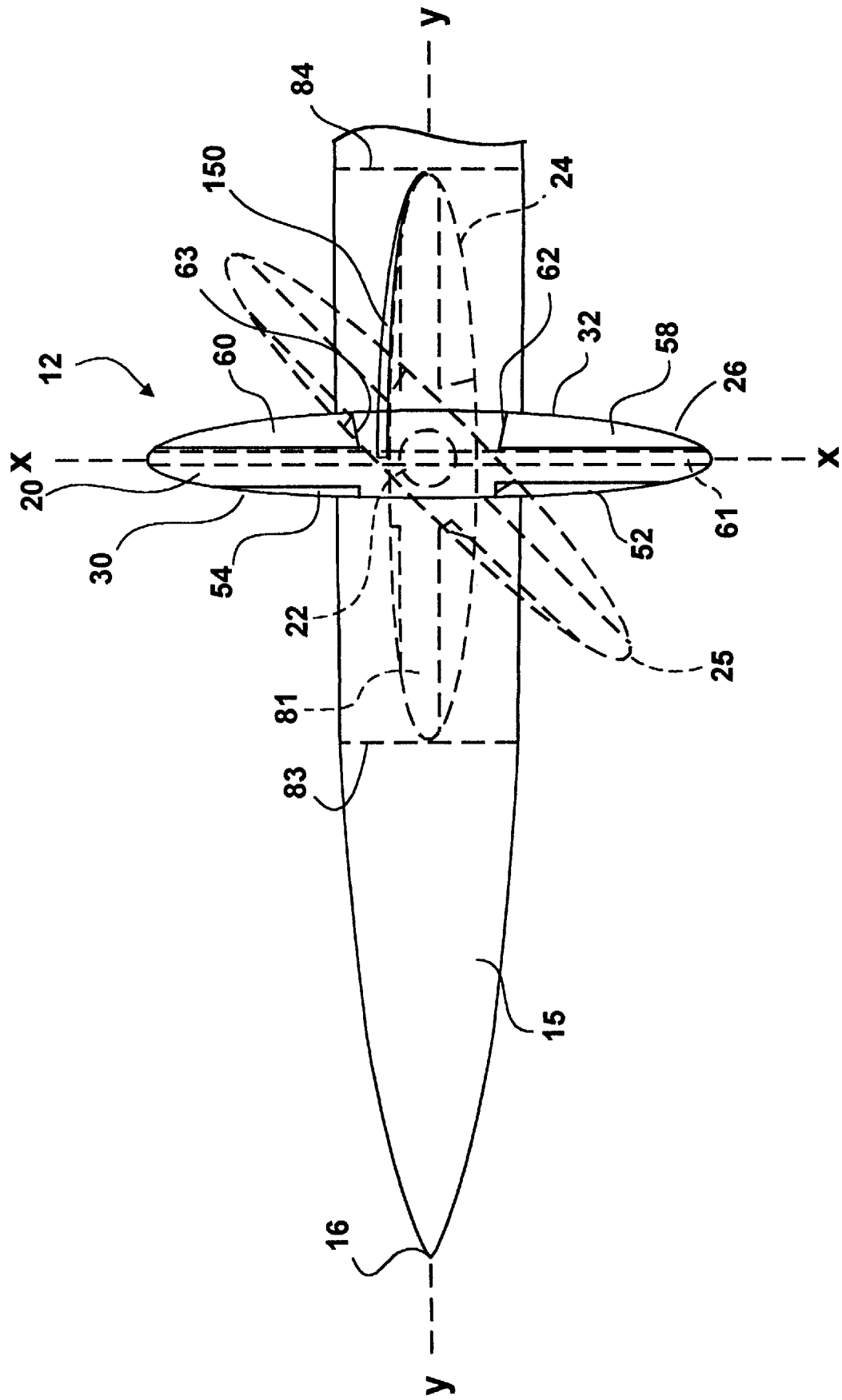
FIG. 2 is an enlarged top plan view of the secondary wing system of FIG. 1.

With reference to FIG. 2, the leading edge control surfaces or slats 52, 54 are generally identical, and are located symmetrically relative to the longitudinal axis Y—Y of the forward fuselage 15. The slats 52, 54 are movably secured to the leading edge 30 of the canard 20 by means of active or passive deployment mechanisms. The slats 52, 54 alter the flow of air over the canard 20, and thus alter the amount of lift generated by the canard 20.

The trailing control surfaces or flaps 58, 60 are generally identical, and are located symmetrically relative to the longitudinal axis Y—Y of the forward fuselage 15. The flaps 58, 60 are movably secured to the trailing edge 32 of the canard 20, by means of active or passive deployment mechanisms. The flaps 58, 60 alter the flow of air over the canard 20, for changing the amount of lift generated by the canard 20. While the slats 52, 54 and the flaps 58, 60 are described as being symmetrically positioned, it should be clear that in other embodiments these control surfaces may be asymmetrically positioned. The deflection of the slats 52, 54 and/or the flaps 58, 60 may be controlled manually by the pilot or automatically by the flight control system. As shown in FIG. 2, the inboard edges 62, 63 of the flaps 58, 60, respectively, may be scarfed to provide clearance with the forward fuselage 15 when they are deflected.

FIG. 7 illustrates the structural attachment and rotation ring assembly 22 that secures the canard 20 to the upper surface 14 of the forward fuselage 15. The assembly 22 may be a conventional mechanism. For instance, the assembly 22 generally includes a mounting and rotation ring 65, a worm gear drive 67, and a rotation actuator 69. The ring 65 is located mid-span of the canard 20 and has its central axis coincide with the axis of rotation R—R of the canard 20. The ring 65 is circular in shape and has equally spaced-apart ridges or teeth 70 along its outer perimeter. The teeth 70 interface in a substantially normal fashion with the corkscrew-like teeth of the worm gear drive 67. Rotation of the canard 20 occurs when the actuator 69 rotates the worm gear drive 67, causing the ring 65 that is directly fastened to the canard 20 to rotate. The structural attachment and rotation ring assembly 22 provides a high-strength mounting and rotation mechanism which allows the use of a single, stowable canard 20 while minimizing intrusion of the mechanical rotation hardware into the volume of the fuselage 15. It should be clear to a person of ordinary skill in the field that alternative rotation mechanisms may be employed.

Referring to FIGS. 3, 4, 5 and 7, a substantially flat stowage surface 81 is formed in the upper portion 14 of the forward fuselage 15. The stowage surface 81 cooperates with the flat underside 37 of the canard 20 for enabling the canard 20 to rotate with minimal friction between the stowed position 24 and the deployed position 26. The stowage surface 81 is shown in FIG. 2 as being defined by the two dashed lines 83, 84. In one embodiment the length of the stowage surface 81, i.e., the distance between the two lines 83 and 84 is approximately equal to the full length or span of the canard 20.

Figure 3:
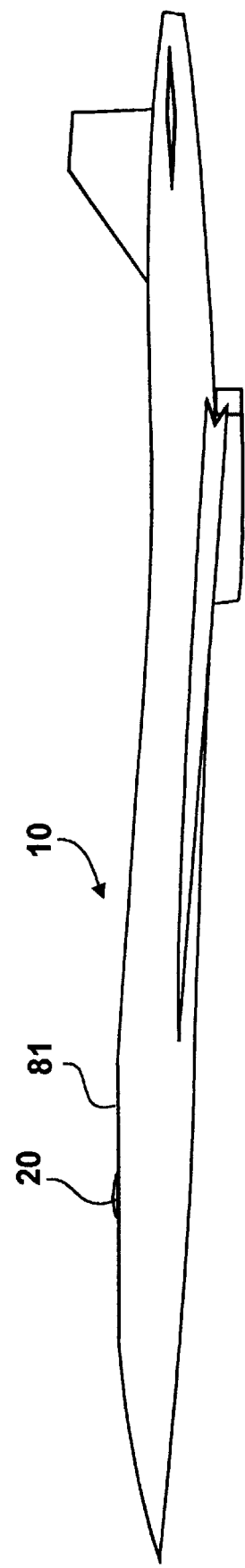
FIG. 3 is a side view of the aircraft of FIG. 1, showing the canard in the deployed position.
Figure 4:
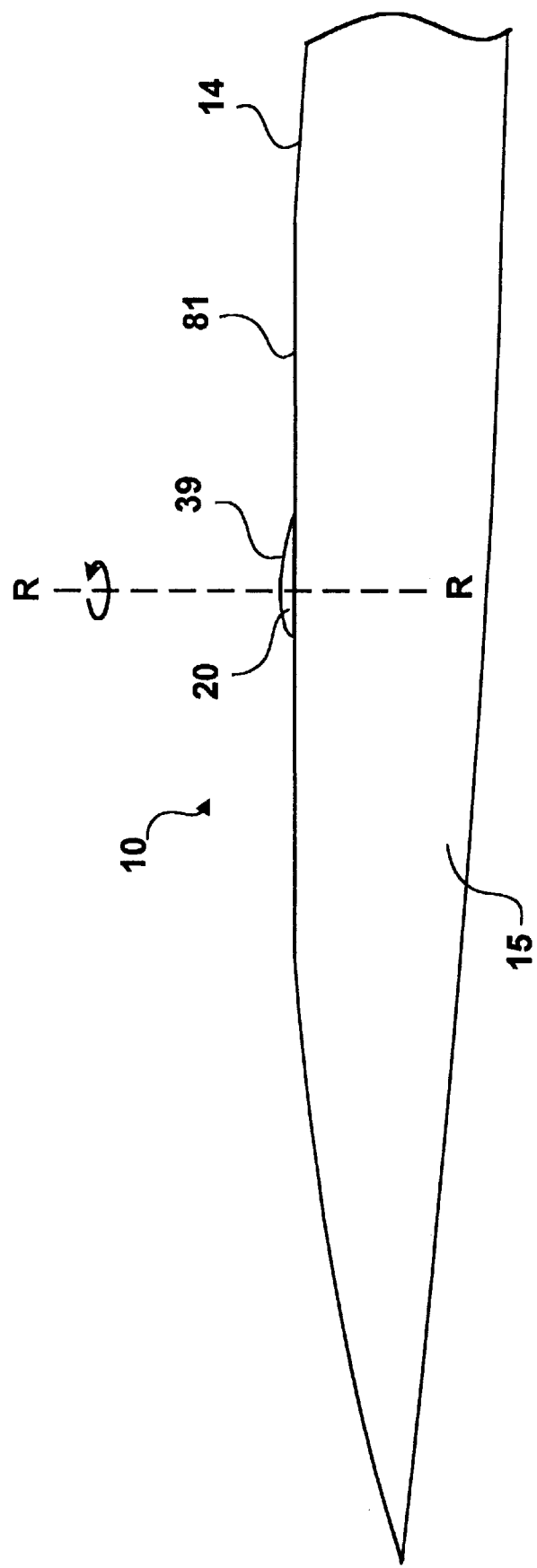
FIG. 4 is an enlarged side view of the canard of FIG. 3, shown in the deployed position.
Figure 5:
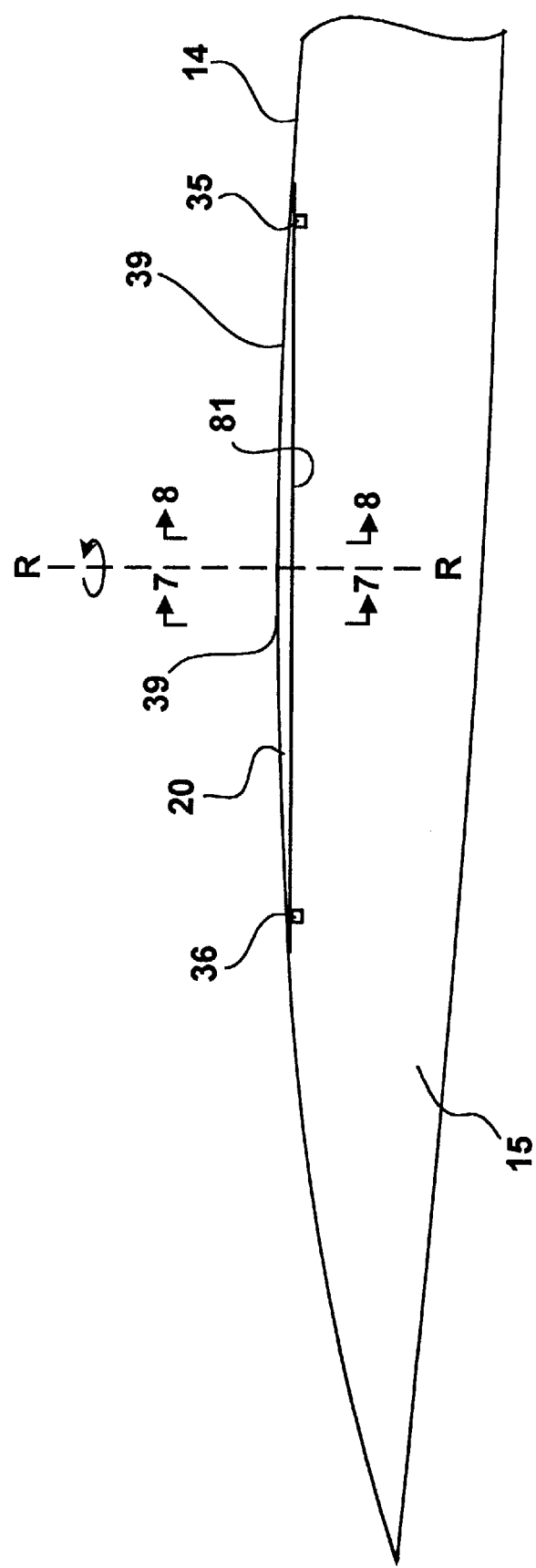
FIG. 5 is an enlarged side view of the canard of FIG. 3 shown in the stowed position.

FIGS. 3 and 4 illustrate that when the canard 20 is deployed, its airfoil shape protrudes above the stowage surface 81. When the canard 20 is stowed, as shown in FIG.

5, the upper surface 39 of the canard 20 forms a generally uniform aerodynamic shape with the contour of the upper portion 14 of the forward fuselage 15. As a result, the canard 20 is stowed, it forms part of the upper surface of the forward fuselage 15 of the aircraft 10, and helps to optimize the aerodynamic efficiency of the aircraft 10 during operation at supersonic or high subsonic speeds.

Figure 6:
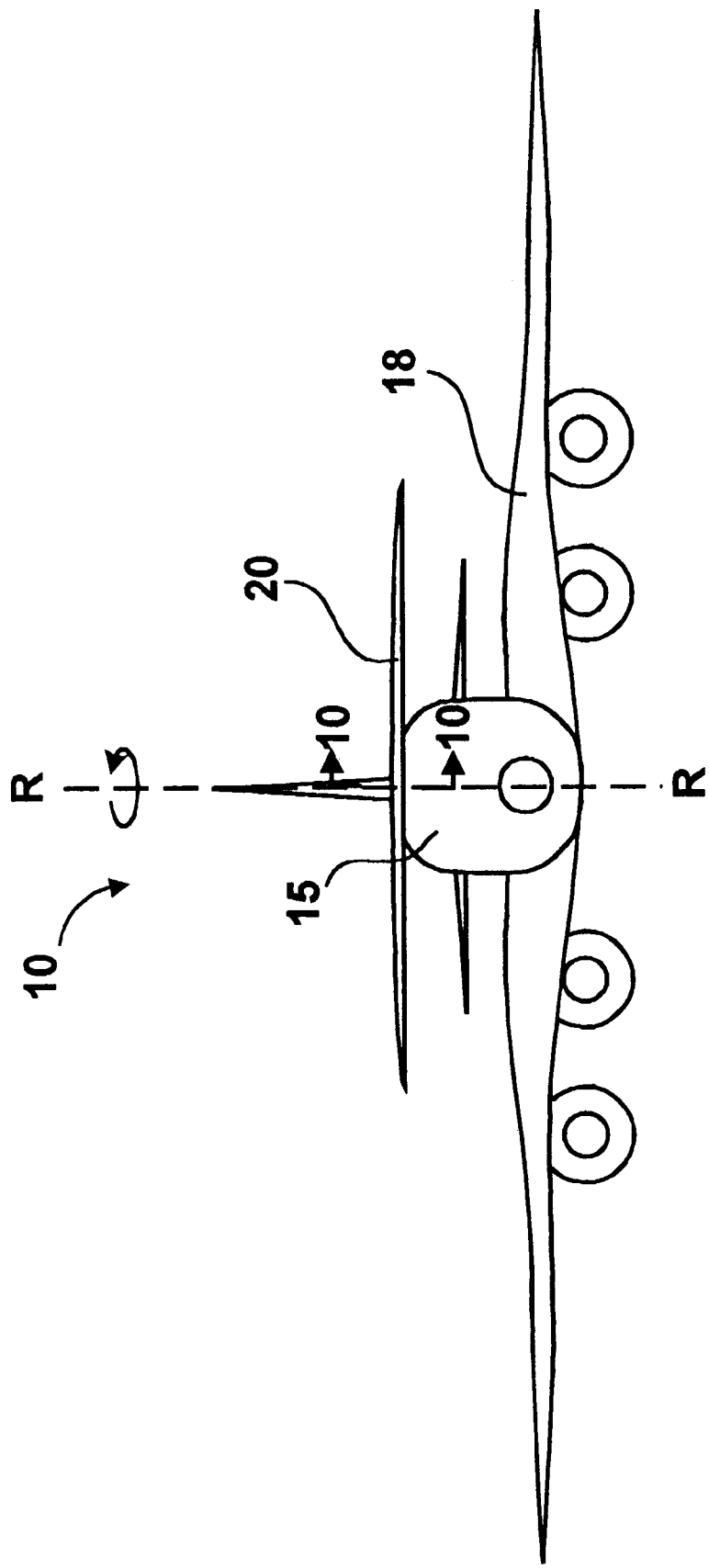
FIG. 6 is a front view of the aircraft of FIG. 1 showing the canard in the deployed position.

Referring to FIG. 6, the canard 20 is located on the upper portion 14 of the forward fuselage 15, and has a shorter span than the main wing 18. For instance, the span of the canard 20 may vary between 25 percent and 50 percent of the span of the main wing. The aspect ratio of the canard 20 may vary between ten and twenty. The aspect ratio is defined as the span divided by the mean chord of the canard 20. Alternative embodiments of the present invention may include a canard of different dimensions or location.

With reference to FIG. 7, a longitudinal cavity 86 is formed within the fuselage external contour 44 adjacent to the stowage surface 81. When the canard 20 is in its stowed position, the cavity 86 conforms to, and houses the leading edge 30 of the canard 20, and further enables the external contour be streamlined with the upper contour 39 of the canard 20.

Figure 8:
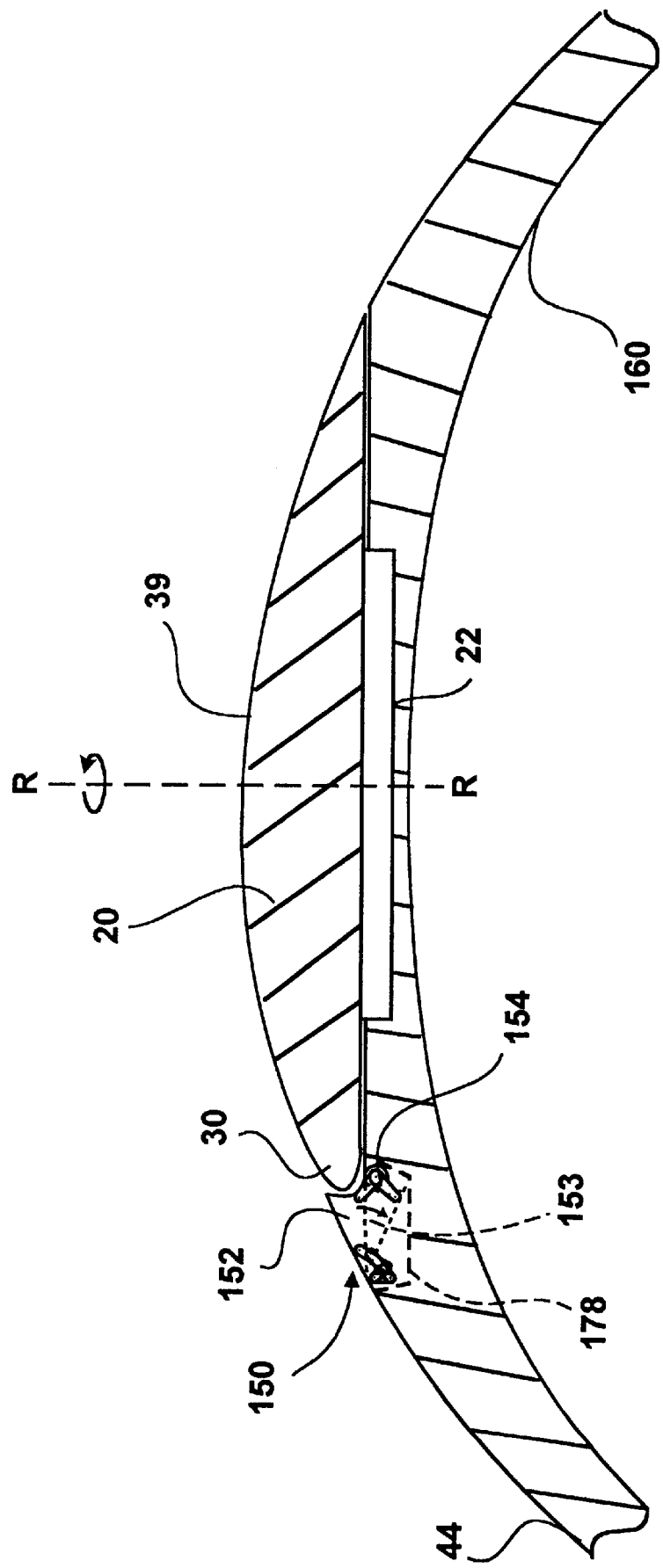
FIG. 8 is a cross-sectional view of the upper fuselage of the aircraft of FIG. 5, taken along line 8—8, showing a retractable fairing which engages a side-facing step created between one half of the leading-edge of the canard and the top of the fuselage when the canard is stowed.

As shown in FIGS. 2 and 8, one half of the cavity 86, either the forward half or the aft half relative to the central axis of rotation R—R, includes a retractable fairing assembly 150 which allows rotation and deployment of the canard 20. FIG. 2 shows the placement of the retractable fairing assembly 150 adjacent to the leading edge 30 of the aft half of the stowed canard 20.

Figure 9:
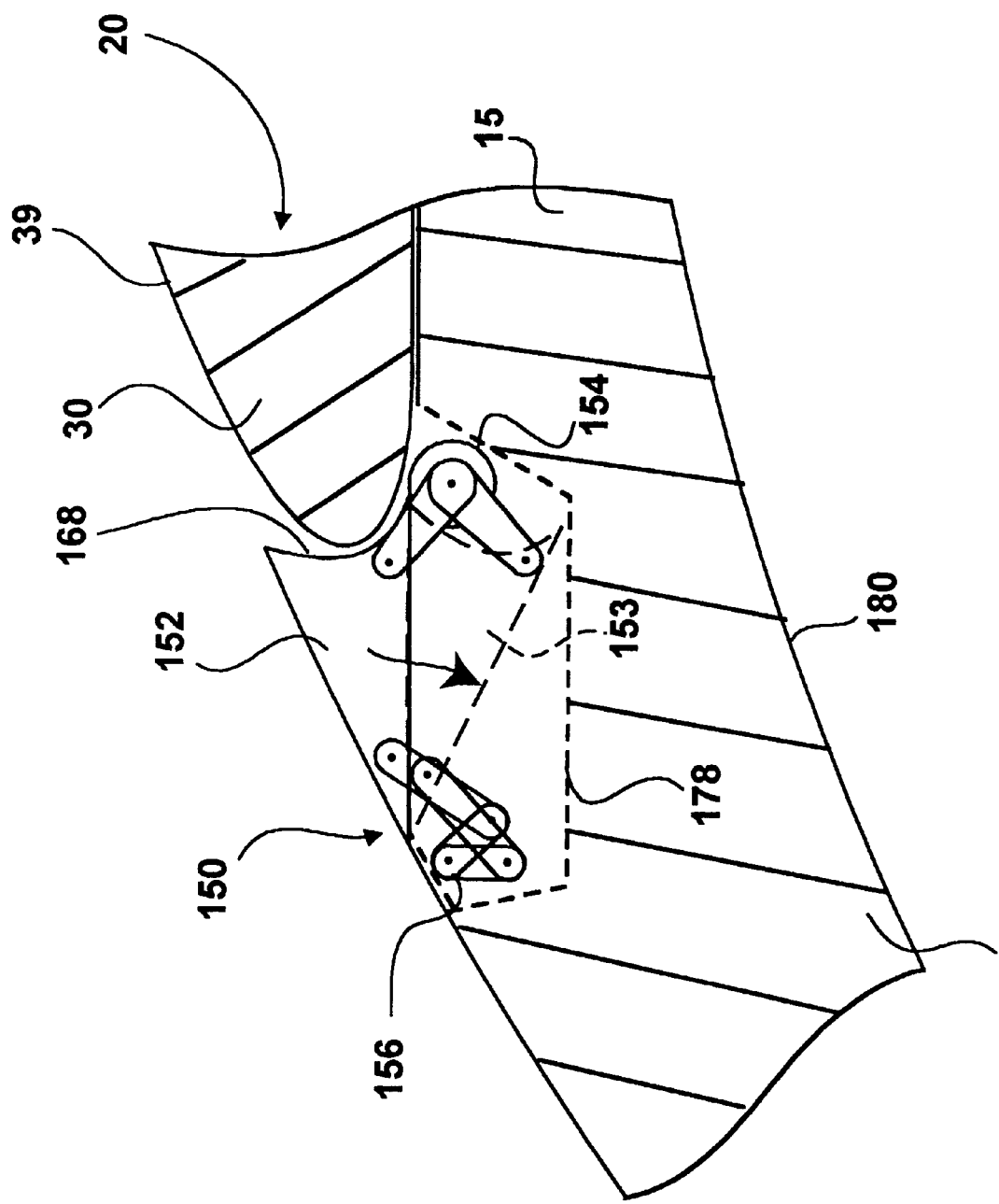
FIG. 9 is an enlarged cross-sectional view of the upper fuselage of FIG. 8, showing the retractable fairing in its extended position (solid lines) and its retracted position (dashed lines)

Referring now to FIG. 9, the retractable fairing assembly 150 generally includes three elements: a fairing 152, a drive actuator 154, and a linkage 156. In its extended position (shown in solid lines and referenced by the numeral 152), the fairing contains a concave recess 168 that conforms to the leading edge 30 of the stowed canard 20 for smoothing the outer shape of the forward fuselage 15 with the upper contour 39 of the canard 20 and optimizing aerodynamic efficiency. In its retracted position (shown in dashed lines and referenced by the numeral 153) the fairing fits substantially within a stowage cavity 178 within a fuselage pressure shell 180, thus allowing deployment and rotation of the canard 20.

The fairing drive actuator 154 and linkage 156 connect the fairing 152 to the forward fuselage 15 and control the position of the fairing 152. For deployment of the canard 20, the actuator 154 pulls the inner edge of the fairing 152 (the edge adjacent to the canard 20) downward while the linkage 156 allows controlled rotation of the outer edge of the fairing 152, causing the fairing 152 to retract into the stowage cavity 178. While FIGS. 8 and 9 show a single retractable fairing system 150 to streamline the aft half of the leading edge 30 of the stowed canard 20, alternative embodiments of the present invention may include more than one retractable fairing assembly on the leading and/or trailing edge of the secondary wing and may include actuator/linkage mechanisms of various types.

Figure 10:
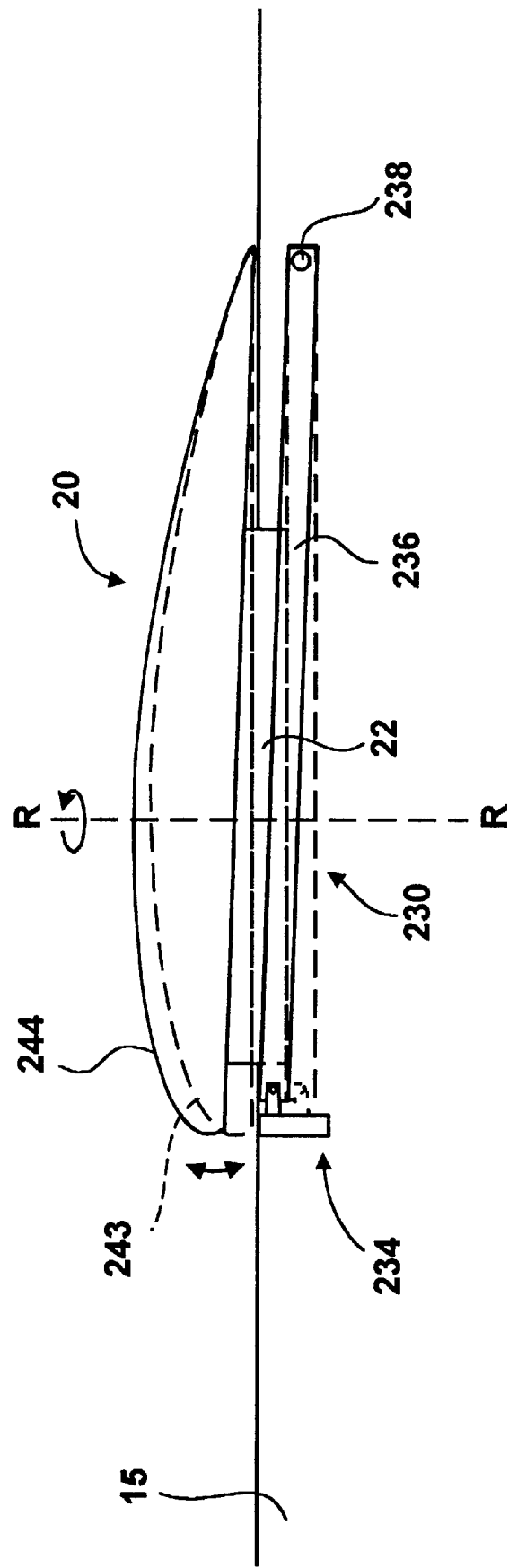
FIG. 10 is a cross sectional view of the aircraft of FIG. 6, taken across line 10—10, showing a variable incidence mechanism in use with the canard in its deployed position.

With reference to FIG. 10, the secondary wing system 12 of the present invention may also include a variable incidence mechanism 230 for changing the angle of incidence of the canard 20. The variable incidence mechanism 230 includes a variable incidence drive actuator 234, a support frame 236, and a hinge 238. The forward end of the frame 236 is connected to the drive actuator 234, while the rearward end of the frame 236 is attached to the hinge 238. The structural attachment and rotation ring assembly 22 is attached to the frame 236. The drive actuator 234 and the hinge 238 are attached to the forward fuselage 15.

The angle of incidence of the canard 20 may be changed from zero incidence (shown in dashed lines and referenced by the numeral 243) to a positive incidence (shown in solid lines and referenced by the numeral 244) by upward displacement of the drive actuator 234. The variable incidence mechanism 230 permits the incidence angle of the retractable canard 20 with respect to the main wing to be varied in order to optimize the aerodynamic performance of the canard 20 in various flight conditions. It should be clear to a person of ordinary skill in the field that alternative features or devices of the variable incidence mechanism 230 may be employed.

Figure 11:
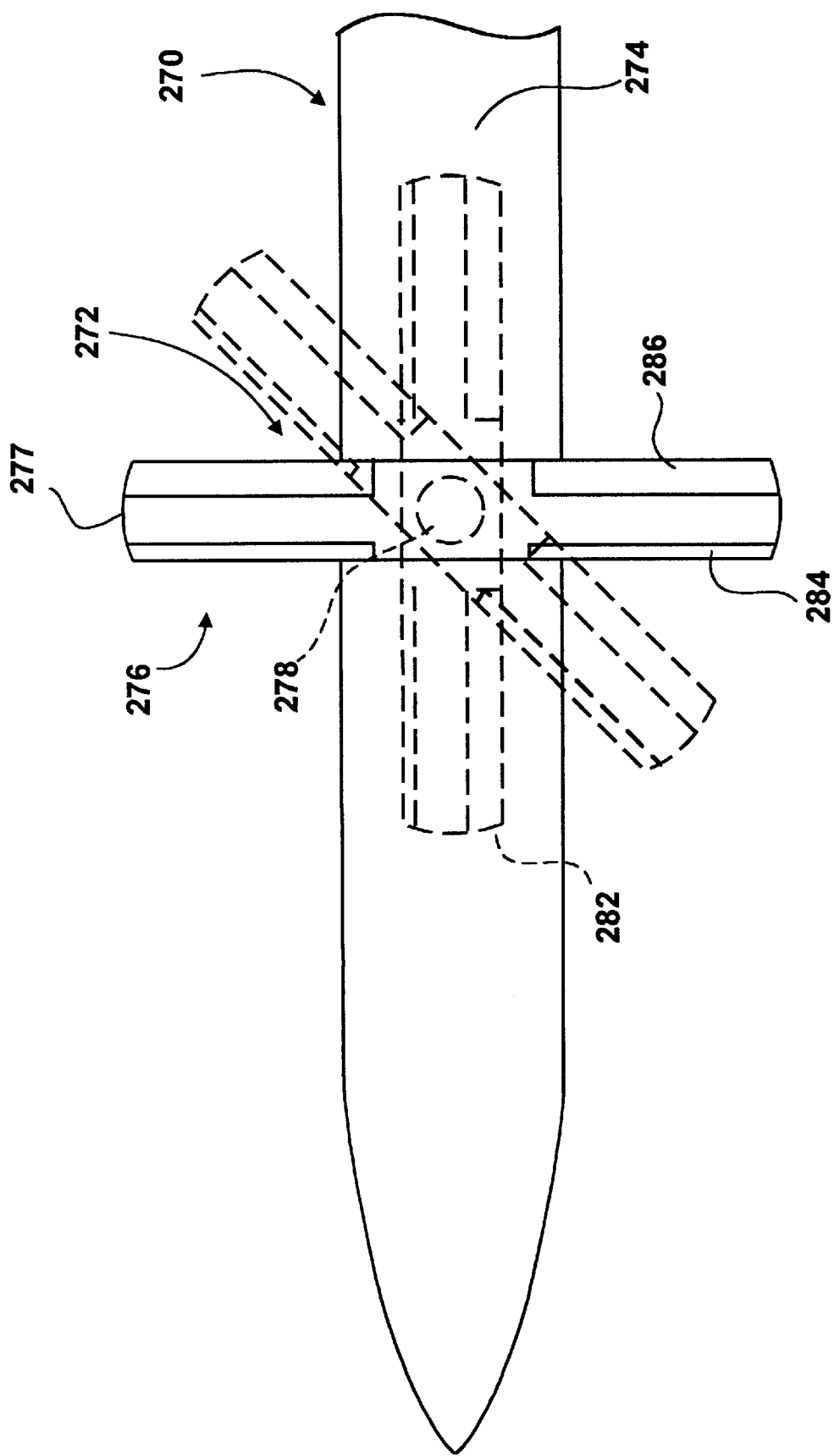
FIG. 11 is a top view of an alternative canard in use on an aircraft with a fuselage having a constant cross-sectional area.

FIG. 11 illustrates an alternative secondary wing system 272 according to the present invention, for use on an aircraft 270 having a cylindrical or constant-area forward fuselage 274. The secondary wing system 272 is similar in structure and function to the secondary wing system 12 of FIG. 1. The secondary wing system 272 includes a one-piece canard 276 and structural attachment and rotation ring 278 which are similar in structure and function to the canard 20 and the structural attachment and rotation ring 22, respectively. Because of the cylindrical shape of the forward fuselage 275, the canard 276 has a substantially rectangular planform shape with arc-shaped wing tips 277 that conform to the contour of the forward fuselage 275, when the canard 276 is in its retracted position (shown in dashed lines and referenced by the numeral 282). The canard 276 may optionally include leading edge control surfaces 284 and trailing edge control surfaces 286 that are respectively similar in structure and function to the control surfaces 30, 32 of FIG. 2.

Figure 12:
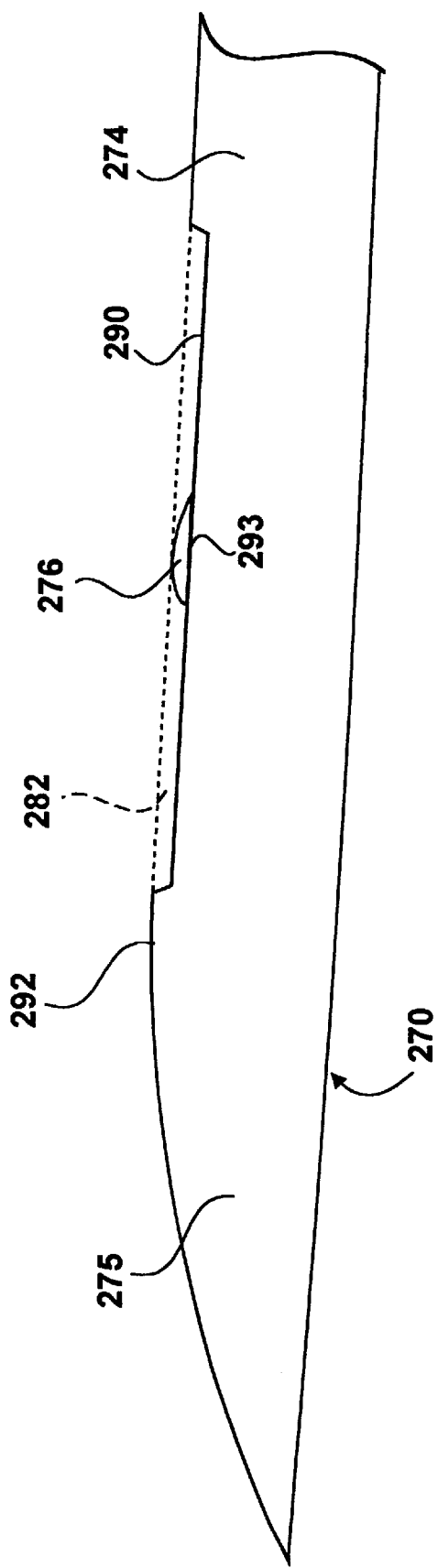
FIG. 12 is a side view of the aircraft of FIG. 11, showing the canard in the deployed position.

With further reference to FIG. 12, the upper portion of the forward fuselage 275 contains a recess 290 within which the canard 276 fits conformally when stowed (shown in dashed lines and referenced by the numeral 282). When the canard 276 is deployed, the bottom surface 293 of the canard 276 is lower than the upper surface 292 of the cylindrical fuselage 275.

Figure 13:
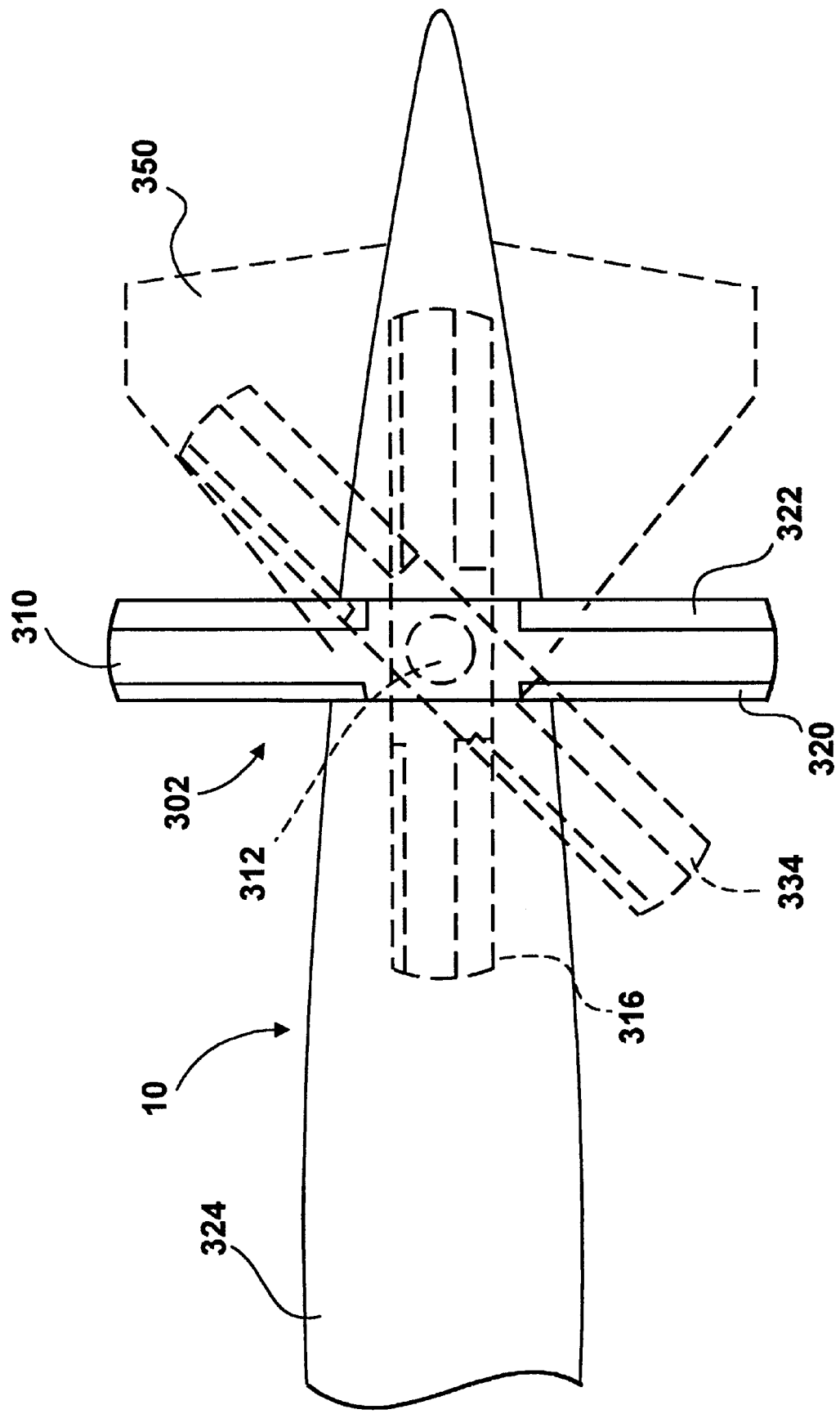
FIG. 13 is a bottom view of part of an aircraft fuselage equipped with a secondary wing system according to the present invention, showing a retractable tail in stowed, intermediate, and deployed positions.
Figure 14:
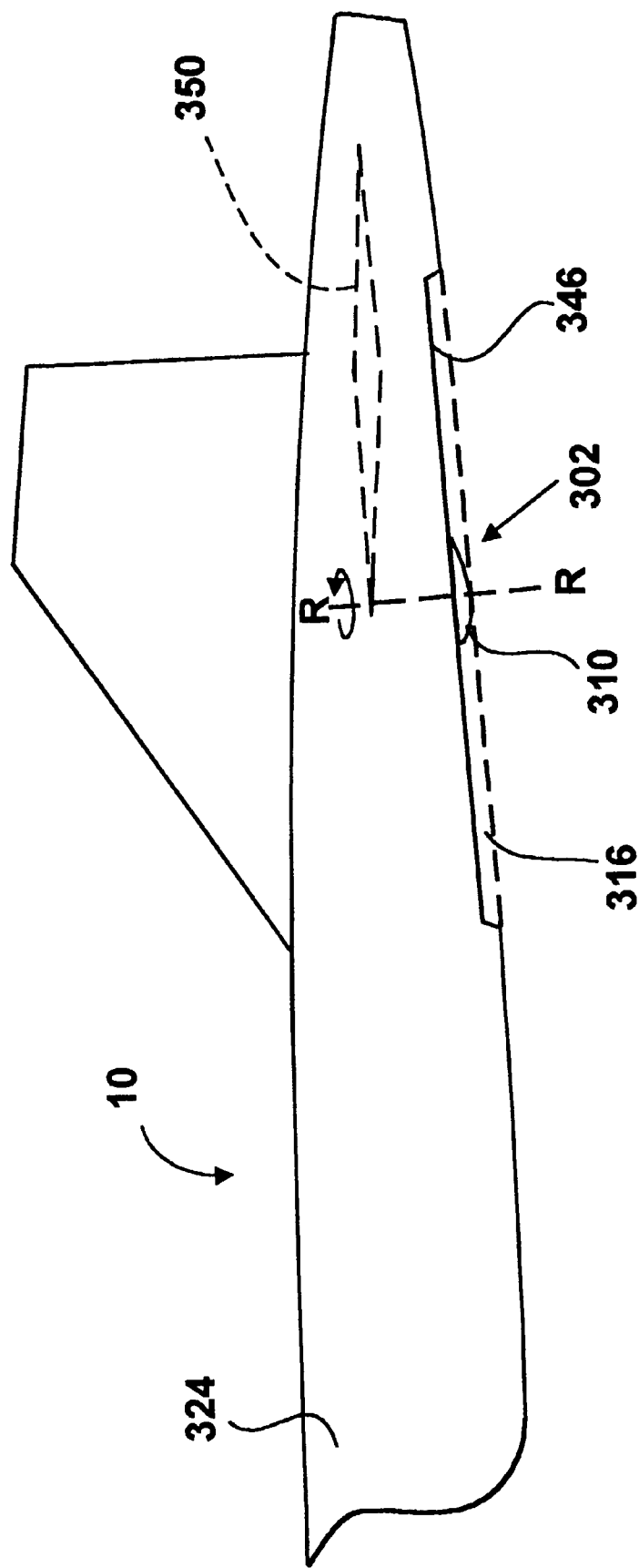
FIG. 14 is a side view of the aircraft fuselage of FIG. 11, showing the retractable horizontal tail in a deployed position (solid line) and in a stowed position (dashed line).

With reference to FIGS. 13 and 14, another alternative embodiment of the present invention includes a secondary tail system 302 for use as a retractable horizontal tail. The secondary tail system 302 generally includes a retractable secondary wing or tail 310 which is similar in structure and function to the canard 276 of FIG. 12, and a structural attachment and rotation ring 312 which is similar in structure and function to the ring 22 of FIG. 1.

The retractable horizontal tail 310 may include leading edge control surfaces 320 and trailing edge control surfaces 322 which are respectively similar in structure and function to the leading and trailing control surfaces 30, 32 of FIG. 2. The retractable horizontal tail 310 rotates about a central axis to the fully deployed position (shown in solid lines and referenced by the numeral 310) which is substantially normal to the aft fuselage 324, to the conformally stowed position (shown in dashed lines and referenced by the numeral 316) within the aft fuselage 324, or to an intermediate position (shown in dashed lines and referenced by the numeral 334).

When stowed, the retractable tail fits conformally within a recess 346 in the lower portion of the aft fuselage 324 as shown in FIG. 14. The secondary tail system 302 may be used in place of, or in addition to, a conventional horizontal tail 350 to optimize control, performance and efficiency of the aircraft 10 during all phases of flight.

While the systems of the present invention are described in use in aircraft, it should be noted that the systems described herein may be applied generally to other types of aerodynamic or hydrodynamic vehicles. Furthermore, while specific embodiments of the present conformally stowable low-speed canard are illustrated and described in accordance with the present invention, modifications and changes of the systems, dimensions, composition, use and operation will become apparent to those skilled in the art, without departing from the scope of the invention.

What is claimed is:

1. A secondary wing system for use on an aircraft forward fuselage, comprising in combination:

a one-piece canard in an elliptical planform shape derived from a waterline cut through the upper portion an area-ruled supersonic fuselage, intermediately positioned between a nose and a main wing; and said canard being secured movably relative to the forward fuselage between a stowed position and a deployed position, so that when said canard is deployed, it provides supplementary lift to the aircraft at predetermined speeds, and when said canard is not in use, it is stowed conformably within a contour of said upper portion of the forward fuselage.

2. The secondary wing system according to 1, wherein said canard is secured via a ring assembly to the forward fuselage so that said canard is selectively deployed and retracted within a selected range of rotation angles about a substantially vertical axis between said stowed position and said deployed position.

3. The secondary wing system according to 1, wherein the span of said canard remains substantially normal to the forward fuselage during take-off in order to optimize control and lift characteristics of the aircraft.

4. The secondary wing system according to 1, further including a latch mechanism that secures said canard when in said stowed position, so as to protect said canard during high-speed flight.

5. The secondary wing system according to 2, wherein said angles of deployment of said canard automatically adjusted by a flight control system.

6. The secondary wing system according to 1, wherein said canard is deployed during approach to landing for augmenting lift and optimizing the stability and control of the aircraft.

7. The secondary wing system according to 1, wherein said canard has an airfoil shape, and is further defined by a leading edge and a trailing edge.

8. The secondary wing system according to 7, wherein said leading edge includes one or more control surfaces for altering the flow of air over said canard, thus altering the amount of lift generated by said canard.

9. The secondary wing system according to 8, wherein said leading edge control surfaces are movably secured to said leading edge by means of a deployment mechanism.

10. The secondary wing system according to 7, wherein said trailing edge includes one or more control surfaces for altering the flow of air over said canard, thus altering the amount of lift generated by said canard.

11. The secondary wing system according to 10, wherein said trailing edge control surfaces are movably secured to said trailing edge by means of a deployment mechanism.

12. The secondary wing system according to 1, wherein said canard has a quasi-elliptical planform shape.

13. The secondary wing system according to 1, wherein said canard has a substantially flat underside for allowing rotation of said canard over the forward fuselage.

14. The secondary wing system according to 1, wherein the upper surface of said canard has an outer contour that aerodynamically blends with an external contour of said upper portion of the forward fuselage.

15. The secondary wing system according to 1, wherein said canard includes a high-strength, structural spar.

16. The secondary wing system according to 15, wherein said canard has an outer contour; and wherein said spar is tapered to fit within said outer contour of said canard.

17. The secondary wing system according to 2, wherein said ring assembly includes a mounting and rotation mechanism that permits the use of said canard with minimal intrusion of an actuation mechanism into the volume of the forward fuselage.

18. The secondary wing system according to 1, wherein said canard has a shorter span than said main wing.

19. The secondary wing system according to 13, wherein the forward fuselage includes a substantially flat stowage surface that blends with said flat underside of said canard for enabling said canard to rotate with minimal friction.

20. The secondary wing system according to 19, wherein said stowage surface is approximately equal in length to the full span of said canard.

21. The secondary wing system according to 20, wherein a longitudinal cavity is formed within the forward fuselage external contour adjacent to said stowage surface.

22. The secondary wing system according to 21, wherein said longitudinal cavity conforms to, and houses the leading edge of said canard for enabling said external contour to be streamlined with the upper contour of said canard when it is in a stowed position.

23. The secondary wing system according to 22, further including a retractable fairing assembly for allowing rotation and deployment of said canard.

24. The secondary wing system according to 23, wherein said retractable fairing assembly includes a fairing, a drive actuator, and a linkage.

25. The secondary wing system according to 24, wherein said fairing contains a concave recess that conforms to a leading edge of said canard when said canard is in a stowed position for optimizing aerodynamic efficiency.

26. The secondary wing system according to 24, wherein said actuator and said linkage connect said fairing to the forward fuselage, and control the position of said fairing.

27. The secondary wing system according to 24, wherein said fairing may be retracted into a stowage cavity within the forward fuselage for deployment of said canard.

28. The secondary wing system according to 1, further including a variable incidence mechanism that permits an incidence angle of said canard with respect to the main wing to be varied in order to optimize aerodynamic performance of the aircraft in various flight conditions.

29. The secondary wing system according to 1, wherein said canard has a generally rectangular planform with arc-shaped wing tips that substantially conform to an outer contour of the forward fuselage.

30. The secondary wing system according to 1, wherein said forward fuselage contains a recess within which said canard fits conformally when stowed such that the upper contour of the forward fuselage conforms with the upper contour of said canard.

\* \* \* \* \*